Sept. 29, 1964  E. J. GAYETSKY  3,150,772
DRIVE FOR A SLIDE FOR AN EXTRUSION PRESS
Filed June 6, 1962  3 Sheets-Sheet 1
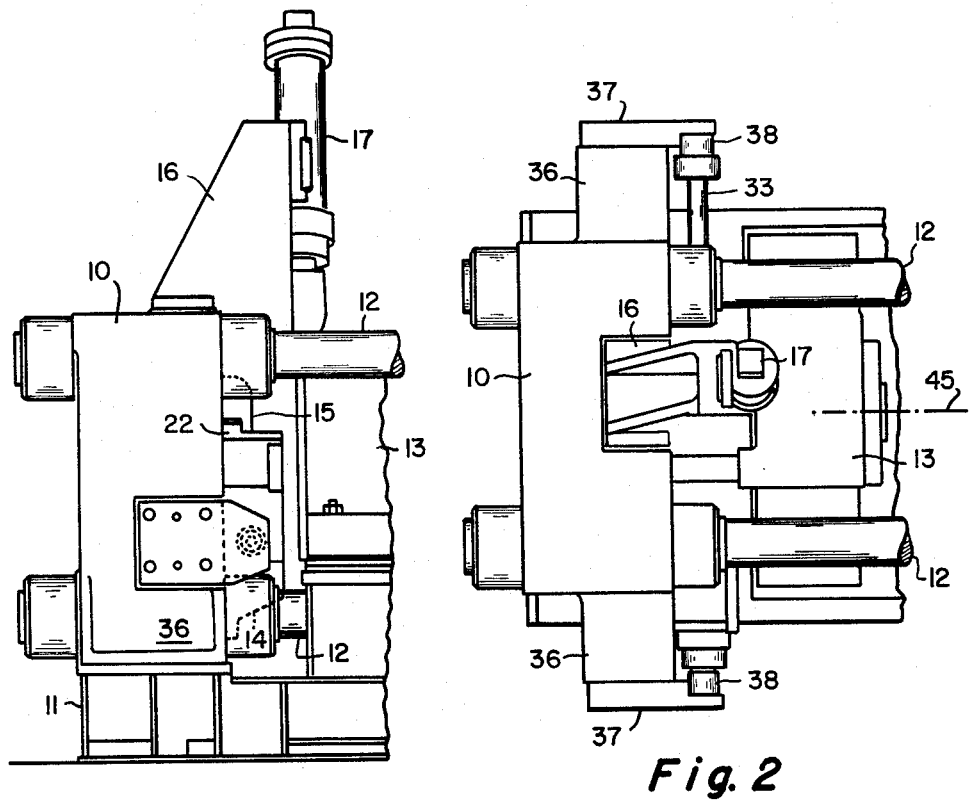
Fig. 1
Fig. 2
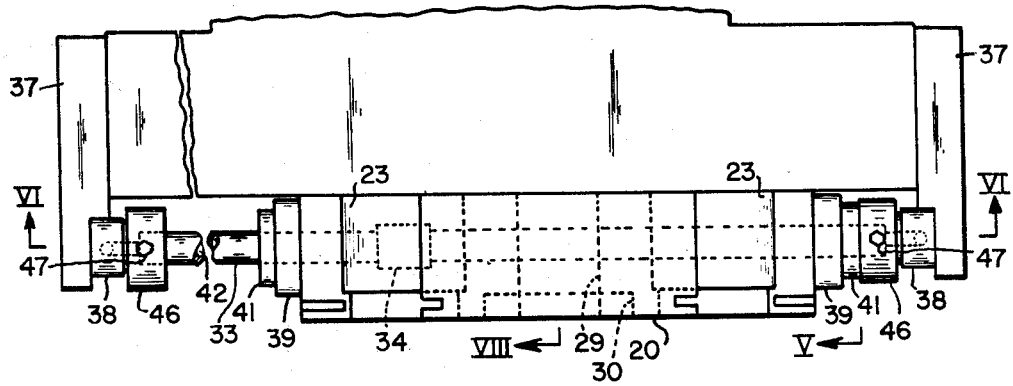
Fig. 3
INVENTOR.
Elmer J. Gayetsky
BY
Woodhams, Mackey & Burden
HIS ATTORNEYS Sept. 29, 1964  E. J. GAYETSKY  3,150,772
DRIVE FOR A SLIDE FOR AN EXTRUSION PRESS
Filed June 6, 1962  3 Sheets-Sheet 2

INVENTOR.
Elmer J. Gayetsky
BY
Webb Mackey + Burden
HIS ATTORNEYS

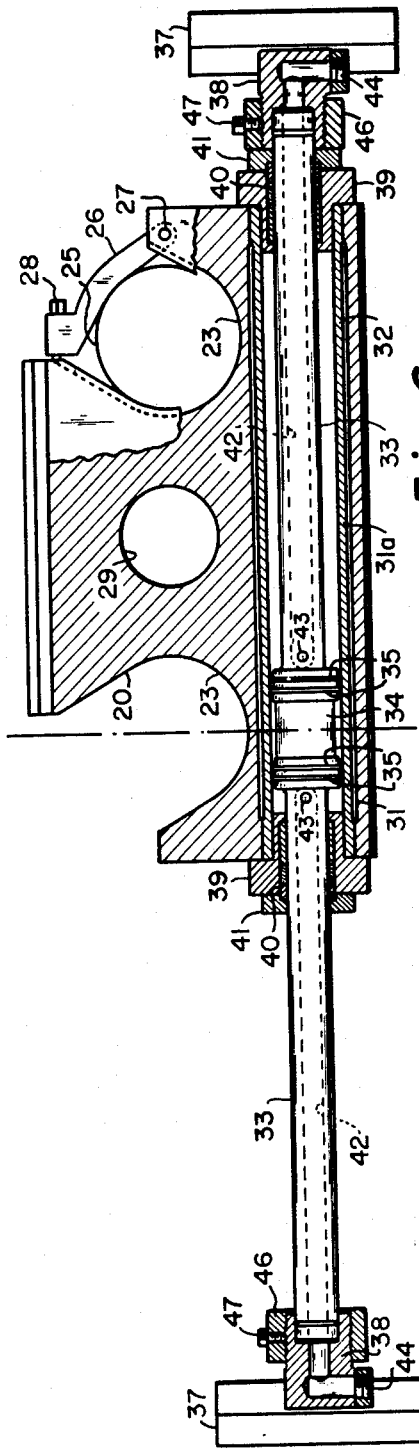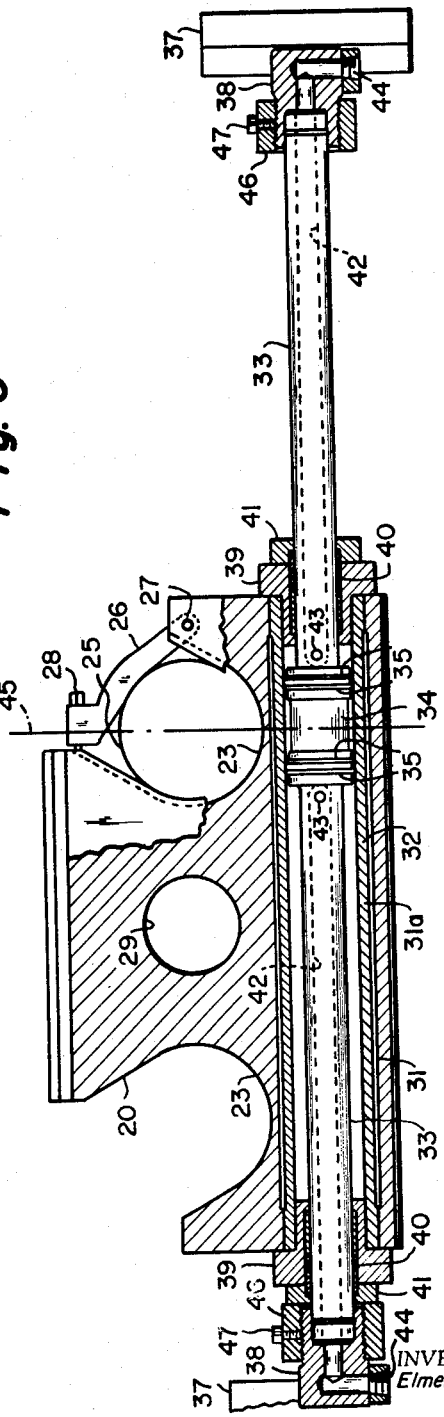

United States Patent Office 3,150,772
Patented Sept. 29, 1964

3,150,772
DRIVE FOR A SLIDE FOR AN EXTRUSION PRESS
Elmer J. Gayetsky, Campbell, Ohio, assignor to Youngstown Foundry & Machine Co., Youngstown, Ohio, a corporation of Ohio
Filed June 6, 1962, Ser. No. 200,579
2 Claims. (Cl. 207—1)

This application relates to a drive for a slide for an extrusion press. More particularly, it relates to a drive for a double slide used on an extrusion press to move dies or containers transversely across the platen of the press to bring the dies or containers in line with the stem of the press for an extrusion operation.

In extrusion presses, so called slides are used to bring dies or containers in line with the stem which presses the material in the container through the die. These slides are mounted on ways so that they move across the face of the platen to align two dies alternately with the stem for an extrusion operation. The die which is not being used is off to one side of the platen so that it can be changed when required. The same arrangement is used for moving two extrusion press containers alternately in line with the stem in so called double-tooling extrusion presses.

Heretofore slide drives have been of two general types. One type has used a rack on the bottom of the slide and a pinion meshing with the rack, the pinion being hydraulic or electric motor driven. Such drives have not been satisfactory because they require a considerable amount of vertical space so that it is difficult to provide a clearance for the slide and the drive between the tie rods of the press. In some instances, it has been necessary to slope the ways on which the slide moves to provide clearance between the tie rods and this sloping of the movement of the slide makes it difficult to align the slide with the press stem. Also, wearing of the drive parts creates alignment problems and the application of a driving force spaced from the center line of the press creates high rotating movements.

Slides have also been driven by a hydraulic cylinder and piston in which the piston was connected to one end of the slide and in which the cylinder extended outwardly from one side of the press. This arrangement has been unsatisfactory because the projecting cylinder required extra floor space and makes it difficult for the operator to reach the tooling.

A slide drive embodying my invention employs a hydraulic cylinder and piston. However, the cylinder is positioned within the body portion of the slide and supports the piston. The piston is centrally mounted on a piston rod which extends through the full length of the cylinder across the face of the platen and beyond the sides of the platen. Portions of adjustable stops mounted on the ends of the piston rod engage fixed stops positioned beyond the sides of the platen. The cylinder moves on the rod, and since it is formed in the body of the slide, the slide likewise moves when hydraulic fluid is supplied to the cylinder on one side or the other of the piston within the cylinder.

This arrangement enables the slide to move horizontally with consequent ease in lining up dies or containers with respect to the press stem, and it permits the operator to be close to the die tooling when setting up the dies for a particular operation. Also it requires a minimum of floor space and a minimum of vertical space between the press tie rods.

The piston rod has adjustable stops at each of its ends against which the slide moves at each end of its path of travel. The ends of the adjustable stops engage fixed stops secured to the press, and by adjustment of the stops on the piston rod, the dies can be easily centered and aligned whenever different dies are installed for making extrusions of various different shapes.

In the accompanying drawing, I have illustrated certain presently preferred embodiments of my invention in which:

FIGURE 1 is a partial front elevation of an extrusion press embodying my invention;

FIGURE 2 is a plan view corresponding to FIGURE 1;

FIGURE 3 is a partial plan view showing a die slide embodying my invention;

FIGURE 6 is a section along the lines VI—VI of FIGURE 3;

FIGURE 7 is a section similar to FIGURE 6 but showing the die slide in a different operative position;

Figure 4:
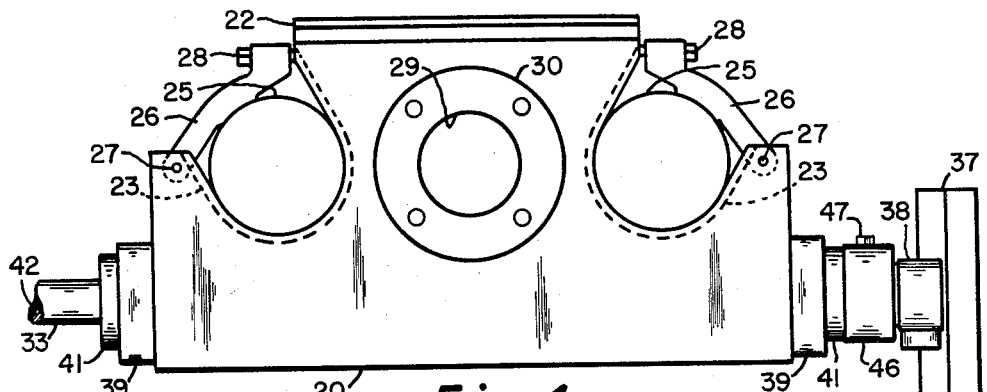
FIGURE 4 is a front elevation of the die slide shown in FIGURE 3.

Referring to the drawings, FIGURES 1 and 2 show a portion of an extrusion press adjacent the platen of the press before which are mounted the dies and containers. The press includes a platen 10 mounted on a bedplate 11 and connected by tie rods 12 to the housing (not shown) which carries the main extrusion cylinder and stem.

Also mounted on the base or bedplate 11 is the container housing 13 which carries the container which in turn holds a billet which is to be extruded.

A bottom guide 14 for the die slide extends horizontally across the front of the platen 10 and a top guide 15 for the die slide extends across the front of the platen 10 above and parallel to the die support 14. The die slide moves across the face of the platen between these guides as will be later explained.

A bracket 16 mounted on the top of the platen 10 carries a hydraulically actuated shear 17 which is used to cut off butts extending from the front of a die after a container has been retracted from the die.

Figure 5:
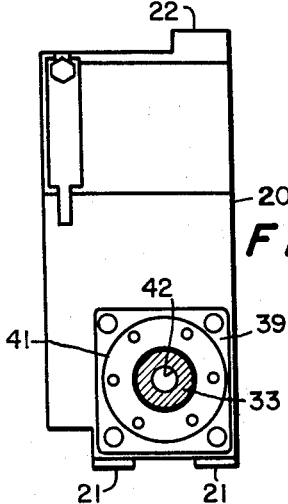
FIGURE 5 is a section along the lines V—V of FIGURE 3.

FIGURES 3, 4 and 5 show a die slide 20 which moves across the face of the platen 10 between the guide supports 14 and 15 on ways 21 (see FIGURE 5). The slide is held within the support 15 by a guide strip 22.

Referring to FIGURE 4, the slide 20 has two die pockets 23 which carry the extrusion dies. These pockets are adjacent the upper corners of the slide and have a semicircular bottom and side portions tangent to the semicircular bottom which extend outwardly from the base at an angle of approximately forty-five degrees to the horizontal. Dies 25 are placed in the pockets and held in the pockets by clamps 26 which extend across the pockets. The clamps are pivoted at their lower ends at 27 on the slide and at their upper ends are held to the slide by bolts 28. By bolting and unbolting the clamps 26 and swinging them about their pivot points, the pockets can be opened and closed to insert and remove dies and hold them in pockets.

The slide also has a central transverse opening 29 which can be used to force stuck billets out of a container. The slide is reinforced around the opening 29 by a pressure plate 30.

Figure 8:
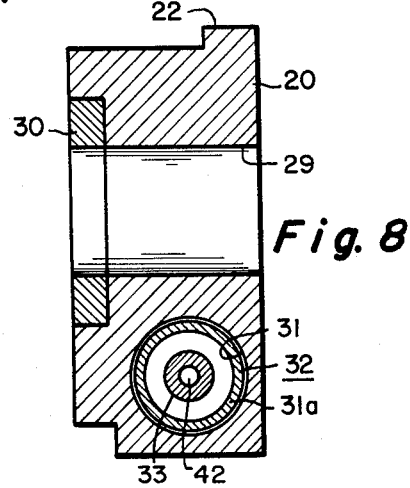
FIGURE 8 is a section along the lines VIII—VIII of FIGURE 3.

Referring to FIGURES 6, 7 and 8, the slide 20 has a circular longitudinal passageway 31 which extends through the slide body and has a liner 31a forming a cylinder 32. A piston rod 33 extends through the cylinder when the slide is positioned on the guide supports 14 and 15. At the center of the rod 33 there is a piston 34 which has piston rings or seals 35 which engage the walls of cylinder 32 and thereby divide the cylinder into two chambers.

As appears in FIGURES 6 and 7, the piston rod 33 is smaller in diameter than the cylinder 32 thus providing space between the piston rod and the cylinder on either side of the piston 34 into which fluid under pressure can be supplied.

Fluid couplings 38 for supplying fluid under pressure to the cylinder are secured to the ends of the piston rod and form parts of adjustable stops (later described) on the ends of the rod which engage plates 37 carried by shoulders 36 extending from the sides of the platen 10 when the slide is moved on the rod.

The ends of the cylinder are closed by packing glands 39 which are bolted to the slide body (see FIGURE 5). Packing 40 (FIGURES 6 and 7) between the glands 39 and the piston rod 33 is held in place by packing retainers 41 bolted to the glands 39.

In operation, fluid under pressure is supplied alternately to the two spaces on either side of the piston 34 between the piston rod 33 and the cylinder. FIGURES 6 and 7 show how fluid under pressure is supplied. As appears in these figures, the piston rod 33 has a central longitudinal passageway 42 and transverse passageways 43 adjacent the ends of the piston 34 which connect the passageway 42 with the spaces between the piston rod and the cylinder on both sides of the piston. The couplings 38 which hold the ends of the piston rod have passageways 44 which lead from the outer ends of the passageway 42 to the outside, the outer ends of the passageways 44 being threaded for connection to a source of fluid pressure.

In FIGURES 6 and 7, the center line of the press has been indicated by the dot and dash line 45. During an extrusion operation, the press stem moves along this line but normal, of course, to the die slide, and viewing FIGURES 6 and 7, it can be seen that the slide is moved from one end of the piston rod to the other in order to line up alternate dies carried by the die slide, the movement being accomplished by supplying fluid under pressure to the appropriate space between the piston rod and the cylinder on one side or the other of the piston 34.

When the slide is moved to bring a die into position for an extrusion operation, it is, of course, important that the die be precisely aligned with the stem. I provide adjustable stops at each end of the pston rod against which the slide abuts when a die is aligned with the stem. The stops are provided by collars 46 which are threaded on the portions of the couplings 38 into which the ends of the piston rod 33 project. The collars 46 can be turned to axially move them to the proper position at which they are held by set screws 47. Upon initial supply of pressure to the cylinder 32 on one side or the other of the central piston 34, the piston rod first moves to take up the clearance space between one of the couplings 38 and the adjacent fixed plate 37.

Figure 9:
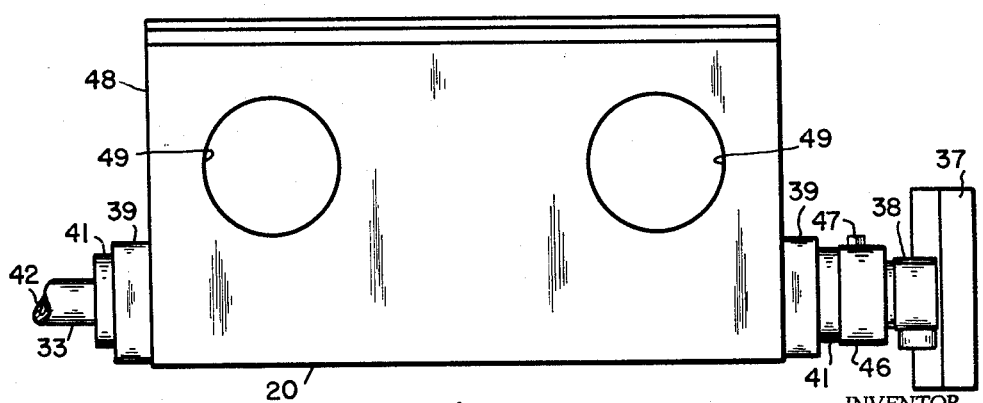
FIGURE 9 is a front elevation of a container slide embodying my invention.

So far the description of my invention has been concerned with a drive for a press slide for moving extrusion dies in and out of position. The same drive can be used to support and move containers in a double-tooling press. FIGURE 9 illustrates a container slide 48 which has a slide body having two transverse passages 49 in which press containers can be inserted. The mounting and drive for the container slide 48 is the same as the mounting and drive for the die slide 20.

While I have described certain presently preferred embodiments of my invention, it is to be understood that it may be otherwise variously embodied within the scope of the appended claims.

I claim:
1. A drive for a slide for an extrusion press having a stem and a platen, said slide being used for moving dies or containers transversely across the platen to bring dies or containers in line with the stem, said drive comprising;
 (A) a slide body,
 (B) means for mounting said slide body for movement on the press across the face of the platen,
 (C) a hollow cylinder within said slide body, said cylinder
  (1) extending longitudinally of the slide body and
  (2) parallel to the face of the press platen,
 (D) a piston rod
  (1) having cross-sectional dimensions smaller than the interior diameter of said cylinder, and
  (2) extending through said cylinder and beyond the sides of the platen,
 (E) a piston
  (1) centrally positioned along the length of said piston rod and
  (2) within said cylinder, and
 (F) means for sealing the ends of the cylinder around the piston rod to provide enclosed spaces between each end of the piston and the ends of the cylinder,
 (G) means for supplying fluid under pressure to said spaces within the cylinder between said piston and the ends of the cylinder, and
 (H) Means for preventing longitudinal movement of the rod upon application of the fluid to said spaces in the cylinder.

2. A drive for a double slide for an extrusion press having a stem and a platen, said slide being used for moving pairs of dies or containers transversely across the platen to bring dies or containers in line with the stem, said drive comprising:
 (A) a slide body,
 (B) means for mounting said slide body for movement on the press across the face of the platen,
 (C) a hollow cylinder within said slide body, said cylinder
  (1) extending longitudinally of the slide body and
  (2) parallel to the face of the press platen,
 (D) a piston rod
  (1) having cross-sectional dimensions smaller than the interior diameter of said cylinder, and
  (2) extending through said cylinder and beyond the sides of the platen,
  (3) having a longitudinally adjustable stop at each end of the piston rod,
 (E) a piston
  (1) centrally positioned along the length of said piston rod and
  (2) within said cylinder,
 (F) means for sealing the ends of the cylinder around the piston rod to provide enclosed spaces between each end of the piston and the ends of the cylinder,
 (G) means for supplying fluid under pressure to said spaces within the cylinder between said piston and the ends of the cylinder, and
 (H) means for preventing longitudinal movement of the rod upon application of fluid to said spaces in the cylinder.

References Cited in the file of this patent
UNITED STATES PATENTS

| | | |
|---|---|---|
| 2,550,925 | Weimar | May 1, 1951 |
| 2,858,017 | Kent et al. | Oct. 28, 1958 |